L. F. PARKS.
WOODWORKING MACHINERY.
APPLICATION FILED AUG. 5, 1910.
989,284.
Patented Apr. 11, 1911.
2 SHEETS—SHEET 1.
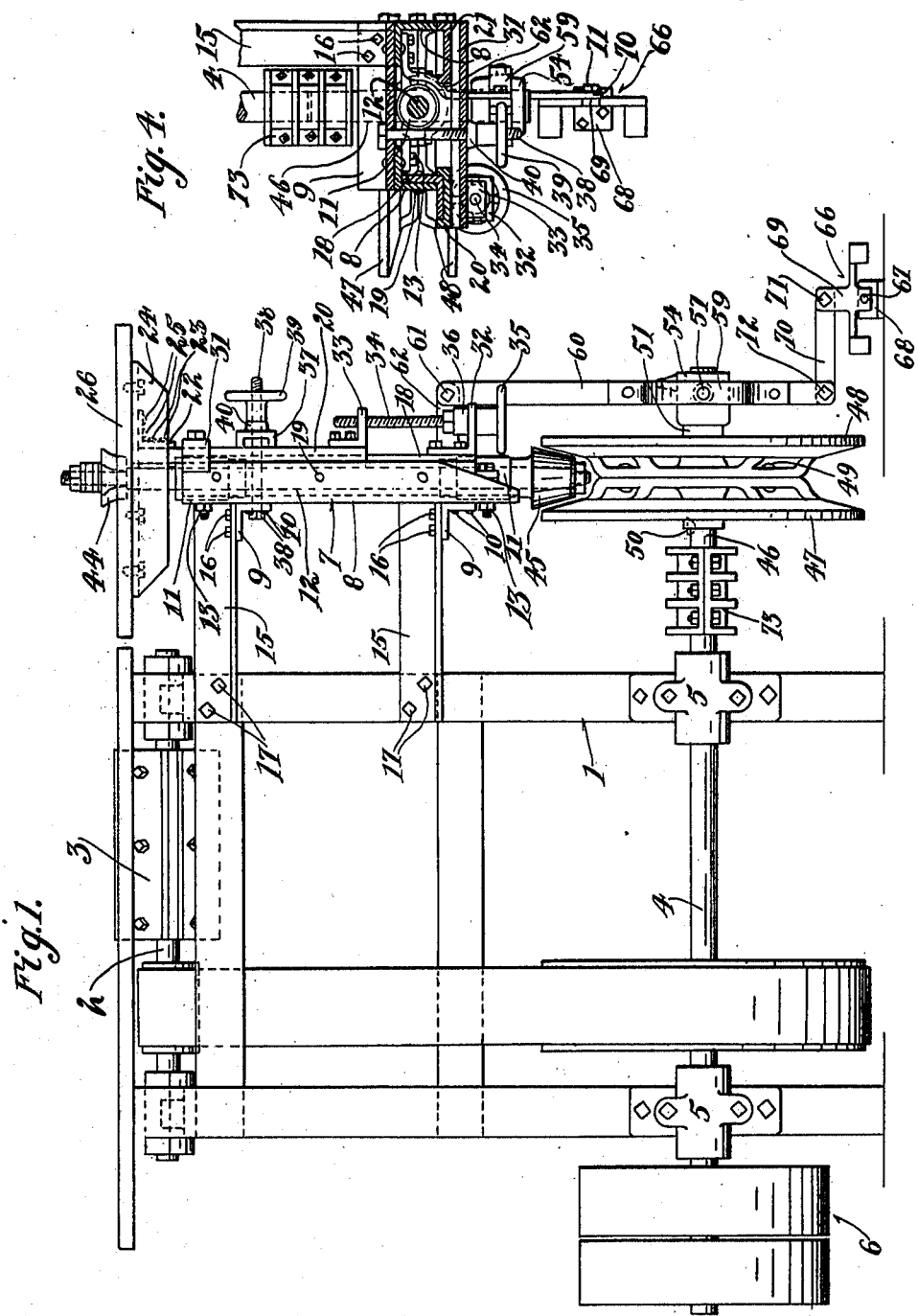

L. F. PARKS.
WOODWORKING MACHINERY.
APPLICATION FILED AUG. 5, 1910.
989,284.
Patented Apr. 11, 1911.
2 SHEETS—SHEET 2.
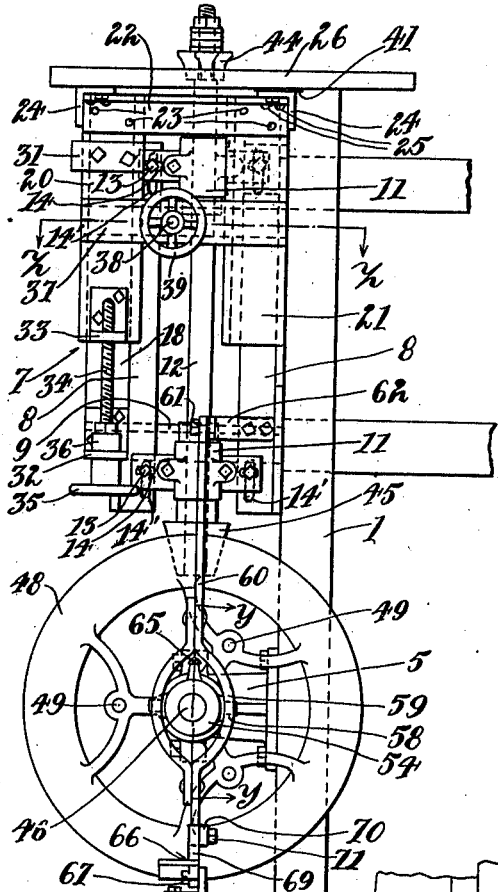
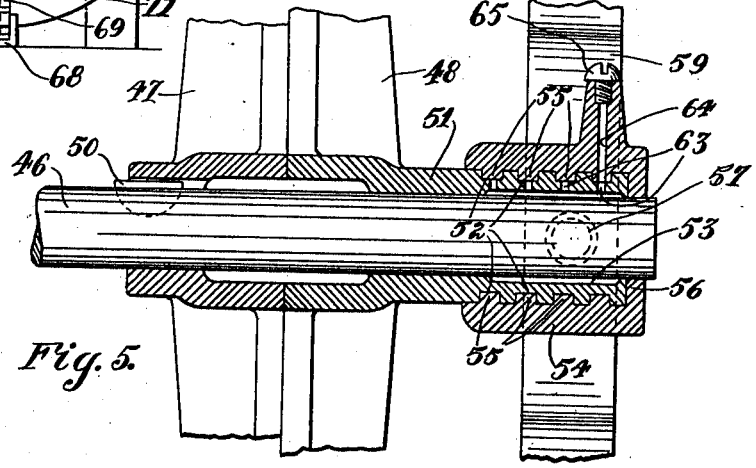
Witnesses:
Inventor:

UNITED STATES PATENT OFFICE.

LEWIS F. PARKS, OF CINCINNATI, OHIO.

WOODWORKING MACHINERY.

989,284. Specification of Letters Patent. Patented Apr. 11, 1911.

Original application filed January 22, 1910, Serial No. 539,586. Divided and this application filed August 5, 1910. Serial No. 575,741.

*To all whom it may concern:*

Be it known that I, LEWIS F. PARKS, a citizen of the United States, residing at Cincinnati, in the county of Hamilton and State of Ohio, have invented certain new and useful Improvements in Woodworking Machinery, (Case B,) of which the following is a specification.

My invention relates particularly to so-called edge molding or shaping machines, in which an upright spindle is employed and arranged for receiving a cutting agency at its upper end.

My invention has for its object the providing of a mechanism of this character which can be employed as an attachment for a suitable wood-working machine employing a cutting agency of different character or as an attachment to a work-bench or other suitable device, whereby economy in space and a cheap construction are obtained.

My invention has for its further object the providing of an overhanging frame of novel construction for supporting the upright spindle, and novel driving means for the same.

The invention will be further readily understood from the following description and claims, and from the drawings, in which latter:

Figure 1 is an elevation of my improved device, showing the supplemental frame in front elevation and the main frame in rear elevation. Fig. 2 is a side elevation of the supplemental frame, and showing the main frame partly broken away. Fig. 3 is a plan view of my improved device, with the table for the supplemental frame removed, and the main frame partly broken away. Fig. 4 is a cross-section on the line z—z of Fig. 2. Fig. 5 is a detail of the connection between the end-shifting means and the connected bevel-friction wheels shown in vertical section on the line y—y of Fig. 2; and, Fig. 6 is an end view of the shifting bearing for the connected bevel-friction wheels.

This application is a division of my application for patent on improvements in combination wood-working machines, filed January 22, 1910, Serial No. 539,586, to which reference is hereby made.

1 represents a suitable supporting frame, which may be the main frame of a woodworking machine, a work-bench, or other suitable device. I have shown the same as the main frame of a wood-working machine, in which a horizontally disposed mandrel 2 is suitably journaled and having on it a suitable planer cutter-head 3, arranged to be driven from a suitable drive-shaft 4 journaled in suitable bearings 5 secured to the main frame, the drive-shaft having thereon a suitable driving agency, as tight and loose pulleys 6.

7 is a supplemental frame secured to the main frame in overhanging relation. It comprises angle-iron uprights 8 and angle-iron cross-girts 9. The angle-iron uprights are spaced apart and the vertical wings of the angle-iron cross-girts are secured to the rear wings of the angle-iron uprights at one of the faces of said last-named wings by rivets 10. Bearings 11 for an upright spindle 12 are secured to said last-named wings at the other of the faces thereof, as by bolts 13, having nuts thereon, the bolts passing through transverse slots 14 in said bearings and upright slots 14′ in said last-named wings, for permitting the spindle to be located at true right angles to the table-top. Said last-named wings form laterally extending wings projected toward each other, the forwardly extending wings of said angle-iron uprights being parallel and having said upright spindle located between them. The supplemental frame is supported in overhanging relation to the main frame by angle-iron stringers 15, the horizontal wings whereof are secured to the horizontal wings of said angle-iron cross-girts 9, as by bolts 16, and the vertical wings whereof are secured to the rear of one of the uprights of the main frame, as by bolts 17. The angle-iron stringers may be secured to the main frame and to the angle-iron cross-girts in such relation that the angle-iron stringers are at right angles to said angle-iron cross-girts, or parallel thereto, as may be desired and be required by the particular relation of supplemental frame and main frame, so as to locate the upright spindle above the drive-shaft.

A supplemental angle-iron upright 18 has its rearwardly extending wing secured, as by rivets 19, to the forwardly extending wing of one of the angle-iron uprights 8. The laterally extending wing of said supplemental angle-iron upright forms a guideway for an upright channel-iron 20, the walls of the channel whereof are received at the sides of said last-named wing, forming an economical guide and guideway. 21 is an upright channel-iron, the edge of one of the walls of the channel whereof is guided upon the outer edge of the forwardly extending wing of the other of said angle-iron uprights 8, the upright channel-irons having secured thereto the vertical wing of an angle-iron cross-girt 22 by rivets 23 for forming a table-slide which may also comprise lateral angle-iron table-supports 24, the horizontal wings whereof are secured, as by rivets 25, to the horizontal wings of said angle-iron cross-girt 22, a table-top 26 being secured to said horizontal wings of said table-supports. A clip 31 is secured to one of said channel-iron uprights and is received to rear of the laterally extending wing of the supplemental angle-iron upright 18 for maintaining close relation between the table-slide and its guideway.

32 is an angle-iron shelf secured to the laterally extending wing of the supplemental angle-iron upright 18 and 33 is an angle-iron shelf secured to the channel-iron upright 20, an adjusting-screw 34 being held against endwise movement, as by a hand-wheel 35 and a collar 36, in the forwardly extending wing of said angle-iron shelf 32 and threaded in the forwardly extending wing of said angle-iron shelf 33, forming a cheap construction. A channel-iron clamp-bar 37 is secured in front of said channel-iron uprights, a clamp-screw 38 being received through and held in the vertical wing of one of the angle-iron cross-girts 9 of said supplemental frame, a clamp-wheel 39 being received over the outer threaded end of said clamp-screw for clamping the table-slide in adjusted positions securely to the supplemental frame, a collar 40 being interposed between the clamp-bar and clamp-wheel. The clamp-screw is preferably located at the side of the upright spindle. The sliding connection between the table-slide and angle-iron uprights of the supplemental frame formed by the lateral wing of one of said angle-iron uprights of said supplemental frame received in the channel of one of the channel-iron uprights of said table-slide, and the other channel-iron upright having one of its walls sliding edgewise upon the edge of the angle-iron upright at the other side of said supplemental frame, affords a cheap construction in that an upright guiding face is necessary only at one side of said table-slide, any variations being accommodated by shims, one of which is shown at 41, between the angle-iron table-supports 24 and the table-top, for leveling the table-top, permitting the use of said channel-iron and angle-iron guides without finishing their guiding surfaces and forming an exceptionally cheap construction.

The upper end of the upright spindle is arranged for receiving a wood-cutting agency shown as a cutter-head 44, arranged to act upon the edge of stock passed over the table-top crosswise of or about the cutter-head. A bevel friction-wheel 45 is secured to the lower end of the upright spindle.

The drive-shaft 4 preferably comprises an extension 46, shown as an overhanging extension, under the supplemental frame, the upright spindle and the drive-shaft being located in coincident vertical planes, and the upright spindle being preferably distanced from the main frame. Opposed bevel friction-wheels 47 48 are slidable axially for bringing the friction-faces thereof selectively into engagement with the bevel friction-wheel at the lower end of said upright spindle for operating the latter in reverse directions, or positioning said opposed bevel friction-wheels in neutral position. The opposed bevel friction-wheels are connected for combined movement, as by rivets 49. They rotate with the drive-shaft, as by reason of spline-connection 50.

51 is a hub for one of the opposed bevel friction-wheels, which forms a sleeve about the shaft. It is provided with a plurality of outer annular grooves 52 and an inner annular recess 53.

54 is a bearing received about the hub and is preferably a Babbitt-metal bearing cast in a mold about the grooved end of the sleeve for providing the same with inner annular ribs 55 received in said annular grooves and an end flange 56 received against the end of said hub 51, and with trunnions 57 arranged to be received in bearings 58 of a yoke 59 of a depending-arm 60 pivoted at 61 to a bracket 62 secured to the supplemental frame. The flange and the plurality of ribs and grooves between the bearing and sleeve made as stated provides a cheap and strong construction for permitting end-thrust to be applied to the movable friction bevel-wheel, this end thrust being in practice very great. The sleeve is provided with apertures 63 which form oil-holes communicating between the inner annular recess 53 and the grooves and ribs between the sleeve and bearing. An oil-passage 64, closed by a screw 65, communicates with the recess 53 for feeding oil thereto.

66 is a treadle pivoted on screws 67 to a block 68 secured to the floor in suitable position, the treadle having an arm 69 which connects with the depending-arm 60 by a link 70 articulated to said respective arms at 71 72.

My improved device comprises an overhanging frame readily secured to a main frame without interfering with the operation of said main-frame device and can be readily removed with its connecting angle-iron stringers if desired. The treadle-mechanism and the opposed bevel friction-wheels are also readily removable. If desired, the drive-shaft extension may be separable from the drive-shaft proper, as by providing a sleeve-connection 73 between the same.

My improved device does not interfere with any other service which may be required of the main drive-shaft, this main drive-shaft remaining stationary longitudinally so that the pulleys thereon may remain at their proper positions irrespective of the operation of the upright spindle.

The upright spindle and the friction bevel-wheel and cutter thereon always remain at fixed distances from and are located in coincident vertical plane with the drive-shaft so that the driving relations for the cutter may always be maintained in economical manner, the adjustments for relation between the cutter and the stock being accomplished by adjustment of the table axially of the upright spindle, the table being clamped to the supplemental frame in adjusted positions for maintaining rigid relation between the stock-supporting surface of the table and the cutting agency.

Having thus fully described my invention, what I claim as new and desire to secure by Letters Patent is:

1. In a wood-working machine, the combination of a main frame, a drive-shaft journaled therein and provided with an overhanging end, a supplemental overhanging frame attached to said main frame, a pair of bevel-friction-wheels having their bevel friction-surfaces presented toward each other and connected for combined movement and located under said supplemental overhanging frame, said connected bevel friction-wheels being slidable on said overhanging end of said drive-shaft and having rotating connection therewith, an upright spindle journaled in said overhanging supplemental frame and distanced from said main frame, said upright spindle arranged for having a cutting agency secured to its upper end, a bevel friction-wheel at the lower end of said upright spindle, the rotary axis of said upright spindle and the rotary axis of said drive-shaft being in coincident vertical plane, a slide adjustable up and down on said overhanging supplemental frame, a table on said slide adjustable therewith to elevation with relation to said cutting-agency, and means for shifting said connected bevel friction-wheels endwise, substantially as described.

2. In a wood-working machine, the combination of a main frame, a drive-shaft journaled therein and provided with an overhanging end, a. supplemental overhanging frame attached to said main frame, a pair of bevel friction-wheels having their bevel friction-surfaces presented toward each other and connected for combined movement and located under said supplemental overhanging frame, said connected bevel friction-wheels being slidable on said overhanging end of said drive-shaft and having rotating connection therewith, an upright spindle journaled in said supplemental overhanging frame and distanced from said main frame, said upright spindle being arranged for having a cutting agency secured to its upper end, a bevel friction-wheel at the lower end of said upright spindle, the rotary axis of said upright spindle and the rotary axis of said drive-shaft being in coincident vertical planes, a slide adjustable up and down on said supplemental overhanging frame, a table on said slide moving therewith to elevation with relation to said cutting agency, a bracket on said supplemental overhanging frame, an arm pivoted to said bracket, said arm having operative engagement with said connected bevel friction-wheels, and treadle mechanism having operative connection with said arm for swinging the same and thereby shifting said connected bevel friction-wheels endwise, substantially as described.

3. In a wood-working machine, the combination of a main frame, a drive-shaft journaled therein, said drive-shaft having an overhanging end, a bevel friction-wheel slidable endwise on said overhanging end, the said bevel friction-wheel and said drive-shaft being provided with connecting means for causing said bevel friction-wheel and drive-shaft to rotate together, a supplemental frame, connecting members secured to said main frame and supplemental frame for causing said supplemental frame to be supported from said main frame in overhanging relation, an upright spindle journaled in said supplemental frame in relation for locating its rotary axis in coincident vertical plane with the rotary axis of said drive-shaft, said upright spindle arranged for having a cutting agency secured to its upper end, a table, a slide on which said table is supported, and means for adjusting said slide up and down on said supplemental frame for adjusting said table to elevation with relation to the cutting agency on said upright spindle, substantially as described.

4. In a wood-working machine, the combination of a main frame, a drive-shaft journaled therein, said drive-shaft having an overhanging end, a supplemental frame comprising vertically disposed angle-irons and horizontal angle-irons rigidly secured together, horizontal angle-iron connecting-stringers rigidly secured to said horizontal angle-irons and to said main frame, bearings secured between said vertically disposed angle-irons, an upright spindle journaled therein, a bevel friction-wheel secured to the lower end of said upright spindle, a second bevel friction-wheel slidable endwise on said overhanging end of said drive-shaft and rotating therewith, a slide, a table thereon, an adjusting screw between said slide and supplemental frame for adjusting said table up and down with relation to a cutting agency arranged to be secured to the upper end of said upright spindle, and a clamp between said slide and supplemental frame for securing said table in adjusted positions, substantially as described.

5. In a wood-working machine, the combination of a main frame, a drive-shaft journaled therein, said drive-shaft having an overhanging end, a supplemental frame comprising vertically disposed angle-irons and horizontal angle-irons rigidly secured together, horizontal angle-iron connecting stringers rigidly secured to said horizontal angle-irons and to said main frame, bearings secured between said vertically disposed angle-irons, an upright spindle journaled therein, a bevel friction-wheel secured to the lower end of said upright spindle, a second bevel friction-wheel slidable endwise on said overhanging end of said drive-shaft and rotating therewith, a slide, a table thereon, means between said slide and supplemental frame for adjusting said table up and down with relation to a wood-cutting agency arranged to be secured to the upper end of said upright spindle, and a clamp between said slide and supplemental frame for securing said table in adjusted positions, a bracket on said supplemental frame, an arm swingingly depending from said bracket and having endwise shifting connection for said second-named bevel friction-wheel, and treadle mechanism for swinging said depending arm and thereby locating said second-named bevel friction-wheel with relation to said first-named bevel friction-wheel at the lower end of said upright spindle, substantially as described.

6. In a wood-working machine, the combination with a main frame, of a supplemental frame comprising angle-iron uprights and angle-iron cross-girts secured together, an upright spindle journaled in said supplemental frame between said angle-iron uprights, said upright spindle arranged for having a wood-cutting agency secured thereto, a bevel friction-wheel secured to the lower end of said upright spindle, a table-slide adjustable up and down on said angle-iron uprights, and angle-iron stringers secured to said supplemental frame and to said main frame securing said supplemental frame to said main frame in overhanging relation, a second bevel friction-wheel, and means for axially moving said second-named bevel friction-wheel for selectively causing engagement between said second-named bevel friction-wheel and said first-named bevel friction-wheel, substantially as described.

7. In a wood-working machine, the combination with a main frame, of a supplemental frame secured to said main frame in overhanging relation, a drive-shaft having an outwardly extending end under said overhanging supplemental frame, a bevel friction-wheel slidable axially about said drive-shaft but rotatable therewith, an upright spindle journaled in said supplemental frame above said drive-shaft arranged for receiving a wood-cutting agency at its upper end, a bevel friction-wheel secured to the lower end of said upright shaft, and means for shifting said first-named bevel friction-wheel endwise into selective engagement with said last-named bevel friction-wheel, substantially as described.

8. In a wood-working machine, the combination of a main frame, a supplemental frame comprising upright angle-irons and angle-iron cross-girts secured together, angle-iron stringers arranged to be secured to the angle-iron wings of said supplemental frame selectively in line with and at right angles to said angle-iron cross-girts and to said main frame, a drive-shaft in line with said angle-iron stringers, a bevel friction-wheel on said drive-shaft, an upright spindle journaled in said supplemental frame above said drive-shaft, and arranged for having a wood-cutting agency secured at its upper end, a bevel friction-wheel secured to the lower end of said upright shaft, and means for shifting said first-named bevel friction-wheel axially into engagement with said last-named bevel friction-wheel, substantially as described.

9. In a wood-working machine, the combination of a frame comprising angle-iron uprights and angle-iron cross-girts, one of the wings of the latter secured to one of the wings of said angle-iron uprights, an upright spindle arranged for having a wood-cutting agency secured at its upper end, bearings therefor secured to said last-named wings of said angle-iron uprights, an angle-iron upright one of the wings whereof is secured to the other of the wings of one of said first-named angle-iron uprights, a slidable upright channel-iron the walls of the channel whereof are received about the other of the wings of said last-named angle-iron upright for being guided thereby, a stock-supporting table secured to said upright channel-iron, adjusting means between said angle-iron uprights and upright channel-iron for moving said upright channel iron up and down and adjusting said table to elevation with relation to said wood-cutting agency, a bevel friction-wheel secured to the lower end of said upright spindle, a second bevel friction-wheel, and means for axially shifting said last-named bevel friction-wheel into selective frictional engagement with said first-named bevel friction-wheel, substantially as described.

10. In a wood-working machine, the combination of a frame comprising angle-iron uprights and angle-iron cross-girts, one of the wings of each of the latter secured to one of the wings of each of said angle-iron uprights, an upright spindle arranged for having a wood-cutting agency secured at its upper end, bearings therefor secured to said last-named wings of said angle-iron uprights, an angle-iron upright one of the wings whereof is secured to the other of the wings of one of said first-named angle-iron uprights, a table-frame comprising upright channel-irons and an angle-iron cross-girt one of the wings whereof is secured to said upright channel-irons, a table secured to the other of the wings of said last-named cross-girts, the walls of the channels of said upright channel-irons having sliding connection with angle-iron uprights of said first-named frame, adjusting means between said table-frame and first-named frame for adjusting said table to elevation with relation to said wood-cutting agency, a bevel friction-wheel secured to the lower end of said upright spindle, a second bevel friction-wheel, and means for axially shifting said last-named bevel friction-wheel into selective frictional engagement with said first-named bevel friction-wheel, substantially as described.

11. In a wood-working machine, the combination of a frame comprising angle-iron uprights and angle-iron cross-girts, one of the wings of the latter secured to one of the wings of said angle-iron uprights, an upright spindle arranged for having a wood-cutting agency secured at its upper end, bearings therefor secured to said last-named wings of said angle-iron uprights, an angle-iron upright one of the wings whereof is secured to the other of the wings of one of said first-named angle-iron uprights, a table-frame comprising upright channel-irons the walls of the channels whereof have sliding connection with angle-iron uprights of said first-named frame, adjusting means between said table-frame and first-named frame for adjusting said table-frame to elevation, a clamp comprising a clamp-bar for said upright channel-irons and clamp-screw and clamp-wheel therefor, said clamp-screw being received through one of said first-named wings of said first-named angle-iron cross-girts at the side of said upright spindle, a bevel friction-wheel secured to the lower end of said upright spindle, a second bevel friction-wheel, and means for axially shifting said last-named bevel friction-wheel into selective frictional engagement with said first-named bevel friction-wheel, substantially as described.

12. In a wood-working machine, the combination with a main frame, of a drive-shaft, a supplemental frame comprising angle-iron uprights and angle-iron cross-girts secured together and supported from said main frame in overhanging relation, an upright spindle journaled in said supplemental frame between said angle-iron uprights, said upright spindle arranged for having a wood-cutting agency secured thereto, a bevel friction-wheel secured to the lower end of said upright spindle, a pair of opposed bevel friction-wheels comprising a sleeve about said drive-shaft, means between said opposed bevel friction-wheels and drive-shaft for causing said opposed bevel friction-wheels and drive-shaft to rotate together, said sleeve having outer annular grooves, a Babbitt-metal bearing cast about said sleeve with ribs received in said groove, and having trunnions cast thereon, an arm depending from said supplemental frame and provided with bearings for said trunnions, and treadle mechanism for moving said Babbitt-metal bearing endwise and thereby shifting said opposed bevel friction-wheels into selective engagement with said first-named bevel friction-wheel, substantially as described.

13. In a wood-working machine, the combination of a frame comprising angle-iron uprights and angle-iron cross-girts, one of the wings of the latter secured to one of the wings of said angle-iron uprights, a table-top, an upright spindle arranged for having a wood-cutting agency secured at its upper end, a bevel friction-wheel, a mating bevel friction-wheel therefor at the lower end of said spindle, bearings for said spindle, said bearings and said last-named wings of said angle-iron uprights being respectively provided with slots which cross each other, and securing means arranged to pass through said slots, and arranged for setting said spindle to elevation with relation to said first-named bevel friction-wheel and at right angles to said table-top, substantially as described.

14. In a wood-working machine, the combination of a drive-shaft, an upright spindle arranged for having a wood-cutting agency secured to one end thereof, a bevel friction-wheel secured to the other end of said upright spindle, a second bevel friction-wheel comprising a sleeve about said drive-shaft, means between said last-named bevel friction-wheel and drive-shaft for causing said last-named bevel friction-wheel and drive-shaft to rotate together, said sleeve having outer annular grooves, a Babbitt-metal bearing cast about said sleeve with ribs received in said grooves and having trunnions cast thereon, an arm provided with bearings for said trunnions, and treadle mechanism for moving said Babbitt-metal bearing endwise, and thereby shifting said last-named bevel friction-wheel into selective engagement with said first-named bevel friction-wheel, substantially as described.

15. In a wood-working machine, the combination with a main frame, of a drive-shaft, a supplemental frame comprising angle-iron uprights and angle-iron cross-girts secured together and supported from said main frame in overhanging relation, an upright spindle journaled in said supplemental frame between said angle-iron uprights, said upright spindle arranged for having a wood-cutting agency secured thereto, a bevel friction-wheel secured to the lower end of said upright spindle, a pair of opposed bevel friction-wheels comprising a sleeve about said drive-shaft, means between said opposed bevel friction-wheels and drive-shaft for causing said opposed bevel friction-wheels and drive-shaft to rotate together, said sleeve having outer annular grooves, an inner annular recess and connecting apertures between said grooves and recess, a Babbitt-metal bearing cast about said sleeve with ribs received in said grooves and having trunnions cast thereon, an arm depending from said supplemental frame and provided with bearings for said trunnions, and treadle mechanism for moving said bearing endwise and thereby shifting said opposed bevel friction-wheels into selective engagement with said first-named bevel friction-wheels, substantially as described.

In testimony whereof, I have signed my name hereto in the presence of two subscribing witnesses.

LEWIS F. PARKS.

Witnesses:
   LILLIAN BURNETT,
   JACOB A. HOLLANDER.

---

Copies of this patent may be obtained for five cents each, by addressing the "Commissioner of Patents, Washington, D. C."